Figure 3:
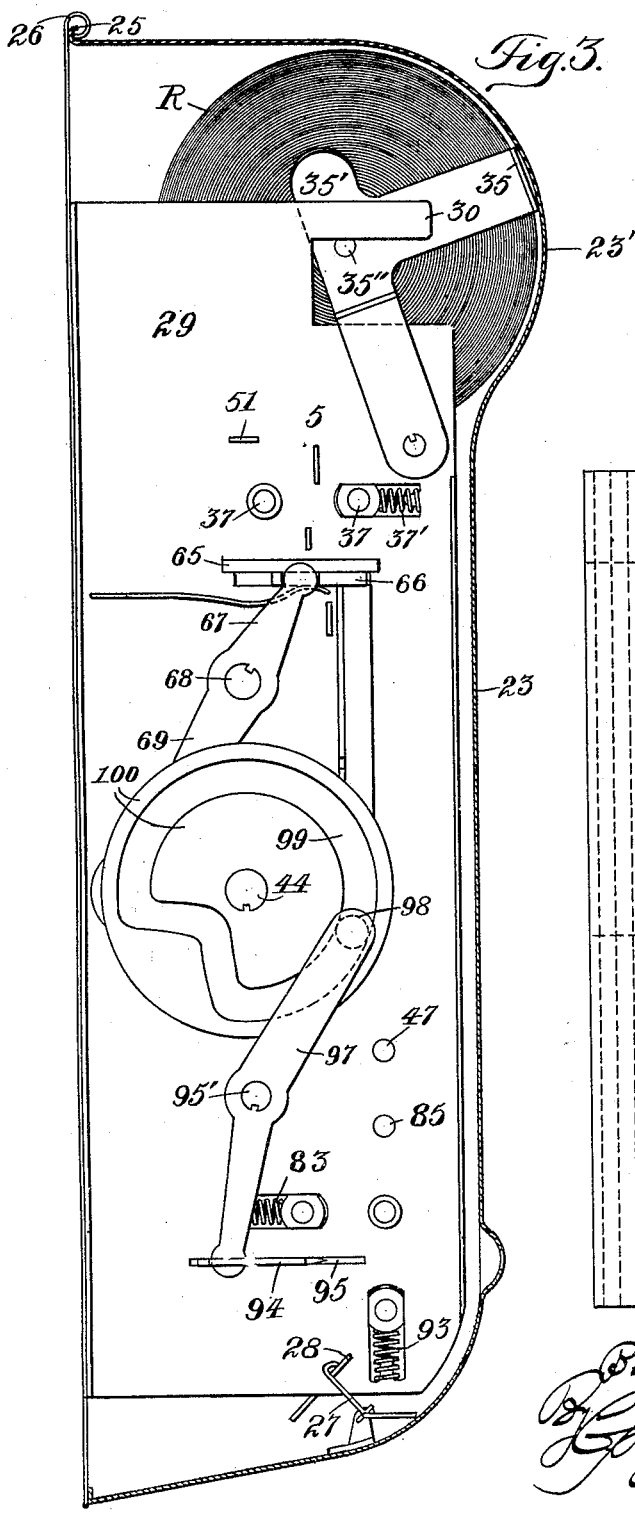

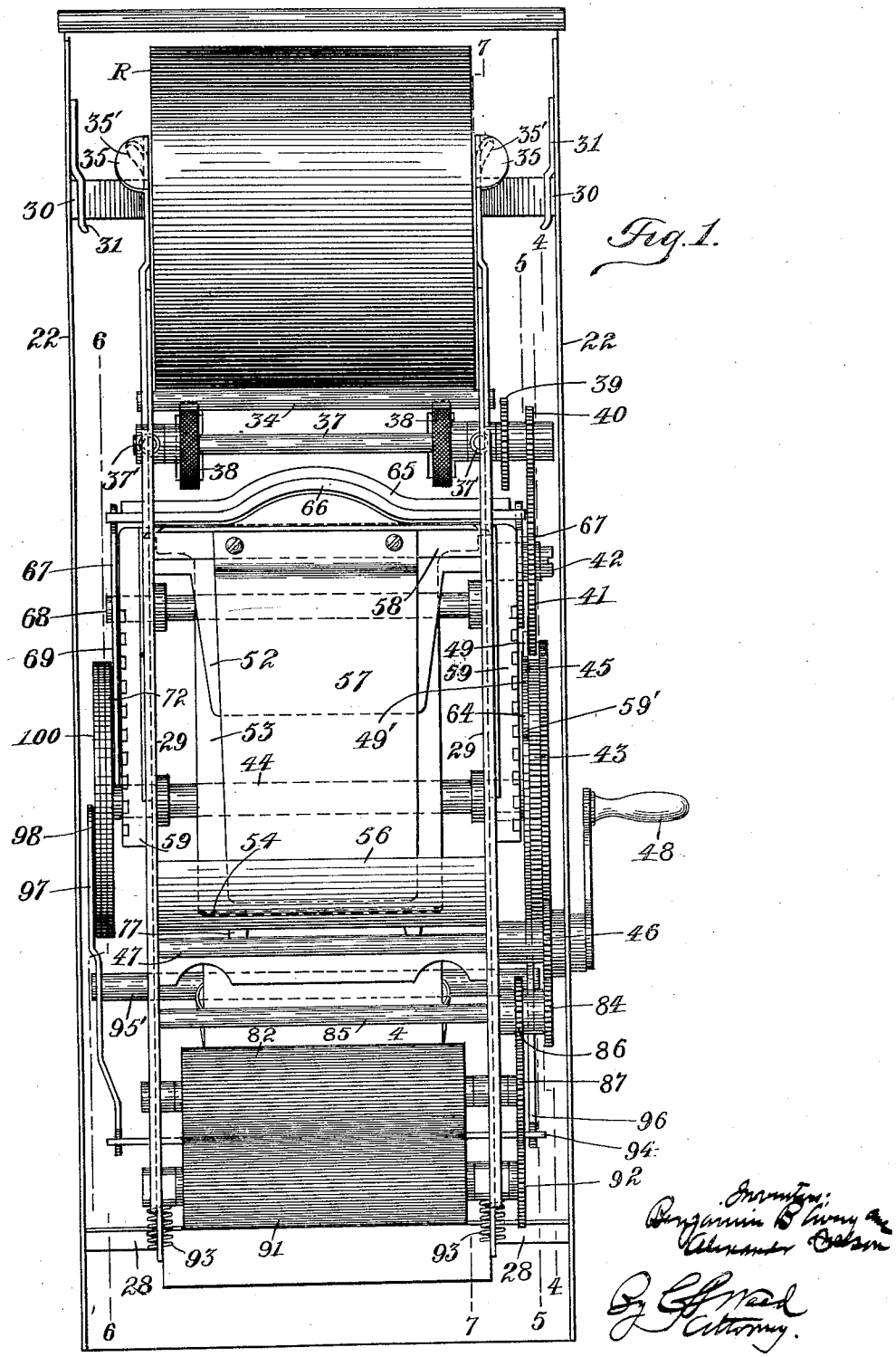

A. NELSON AND B. B. AVERY.
MACHINE FOR MANUFACTURING AND VENDING SANITARY DRINKING CUPS.
APPLICATION FILED MAY 10, 1919.
1,341,836.
Patented June 1, 1920.
9 SHEETS—SHEET 2.
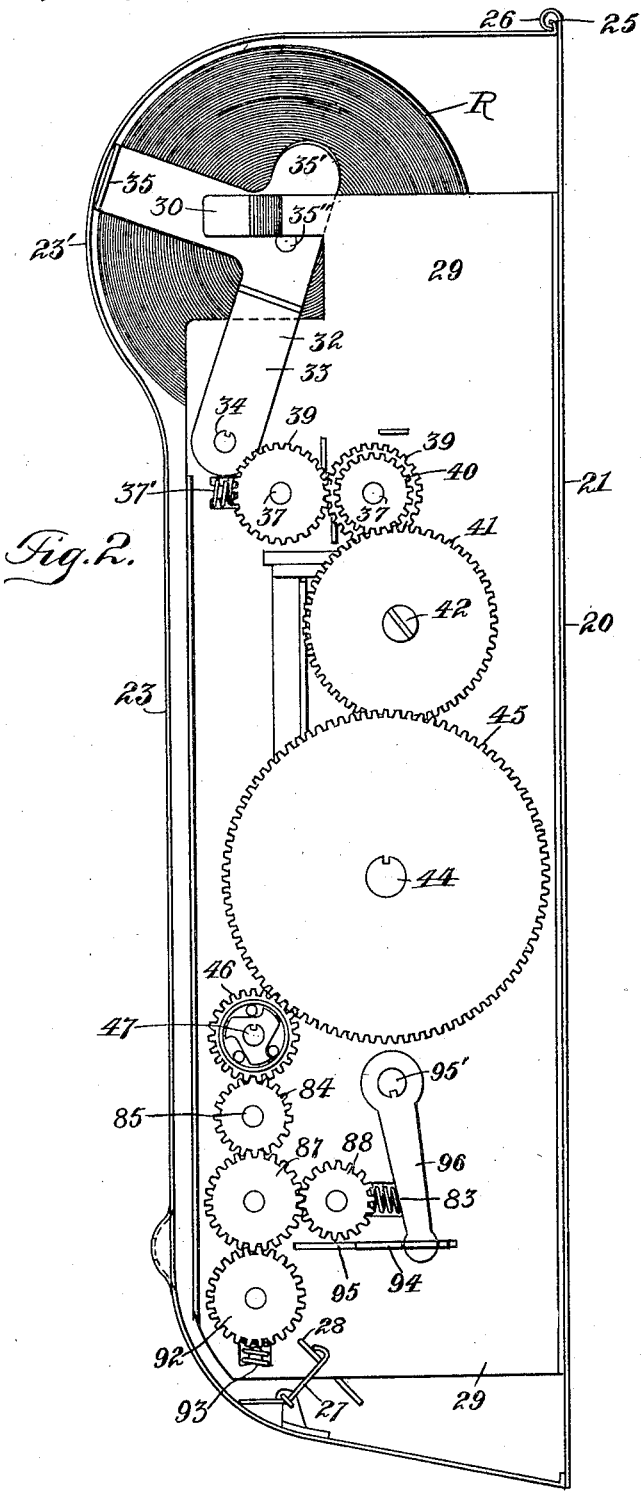
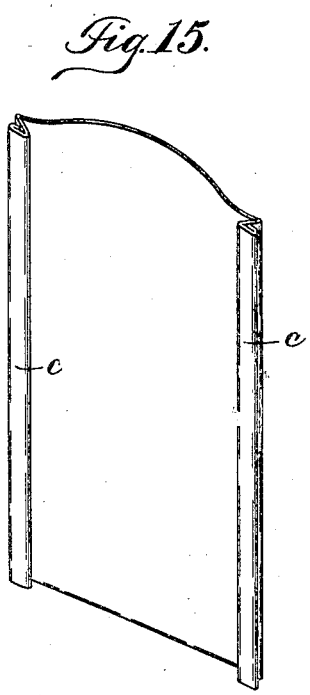

A. NELSON AND B. B. AVERY.
MACHINE FOR MANUFACTURING AND VENDING SANITARY DRINKING CUPS.
APPLICATION FILED MAY 10, 1919.

1,341,836.

Patented June 1, 1920.
SHEETS—SHEET 3.

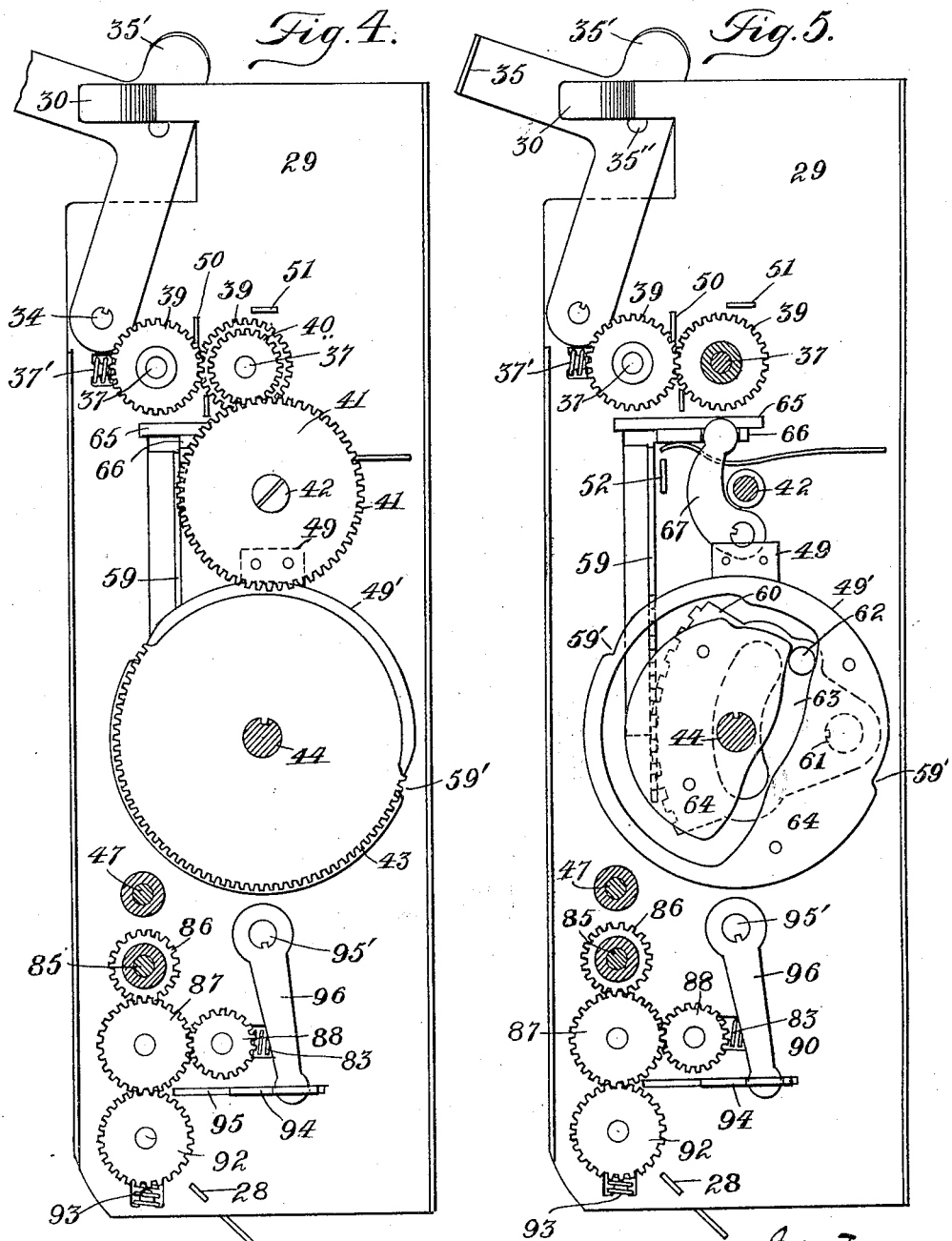

A. NELSON AND B. B. AVERY.
MACHINE FOR MANUFACTURING AND VENDING SANITARY DRINKING CUPS.
APPLICATION FILED MAY 10, 1919.
1,341,836.
Patented June 1, 1920.
9 SHEETS—SHEET 5.
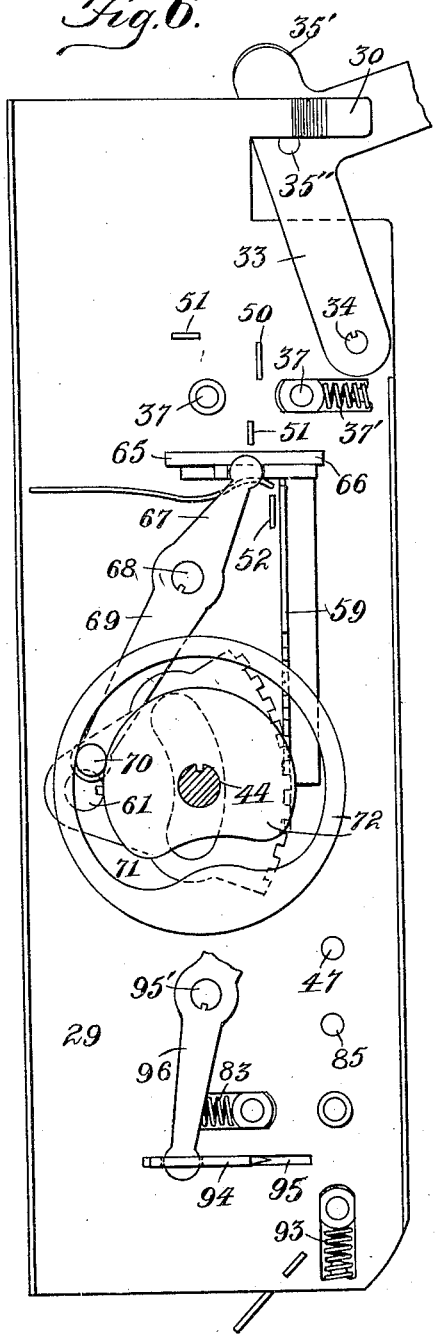
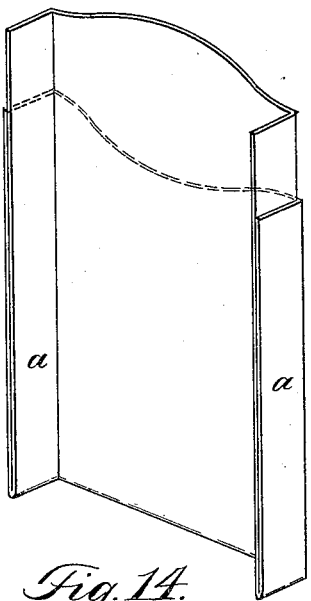
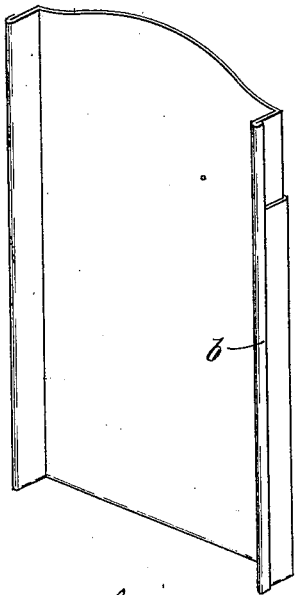

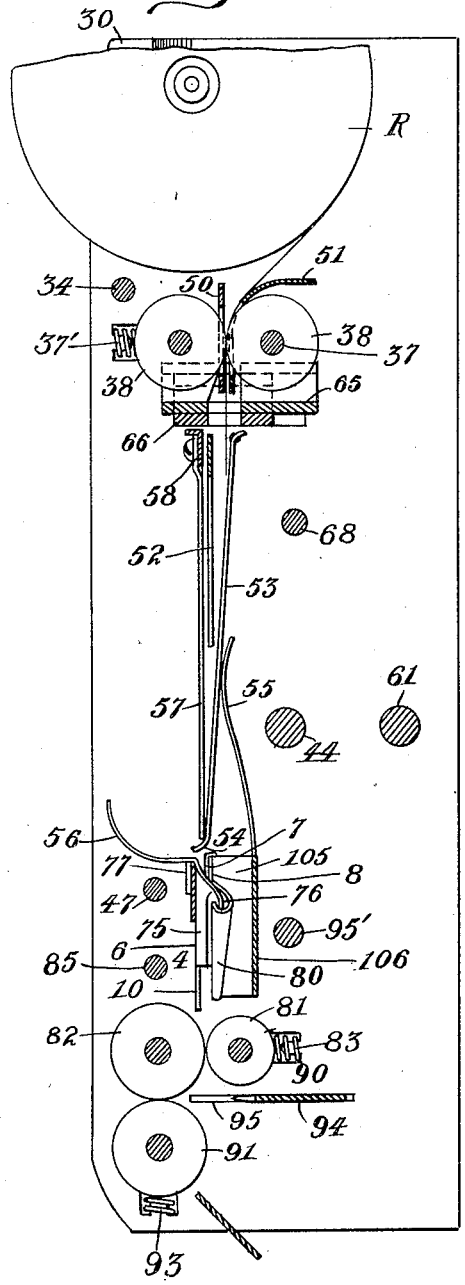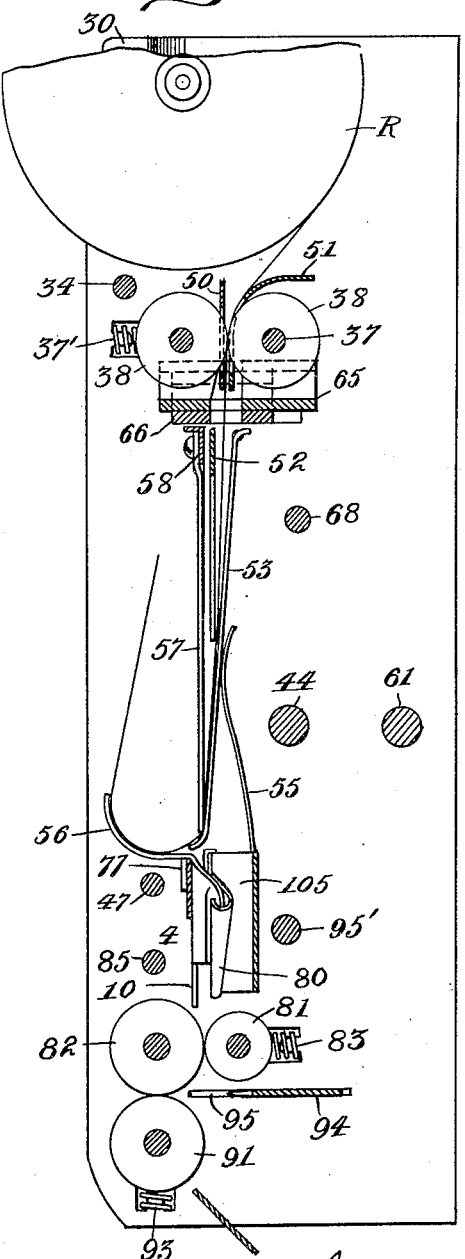

A. NELSON AND B. B. AVERY.
MACHINE FOR MANUFACTURING AND VENDING SANITARY DRINKING CUPS.
APPLICATION FILED MAY 10, 1919.

1,341,836.

Patented June 1, 1920.

9 SHEETS—SHEET 7.

A. NELSON AND B. B. AVERY.
MACHINE FOR MANUFACTURING AND VENDING SANITARY DRINKING CUPS.
APPLICATION FILED MAY 10, 1919.

1,341,836.

Patented June 1, 1920.
9 SHEETS—SHEET 8.

A. NELSON AND B. B. AVERY.
MACHINE FOR MANUFACTURING AND VENDING SANITARY DRINKING CUPS.
APPLICATION FILED MAY 10, 1919.
1,341,836.
Patented June 1, 1920.
9 SHEETS—SHEET 9.
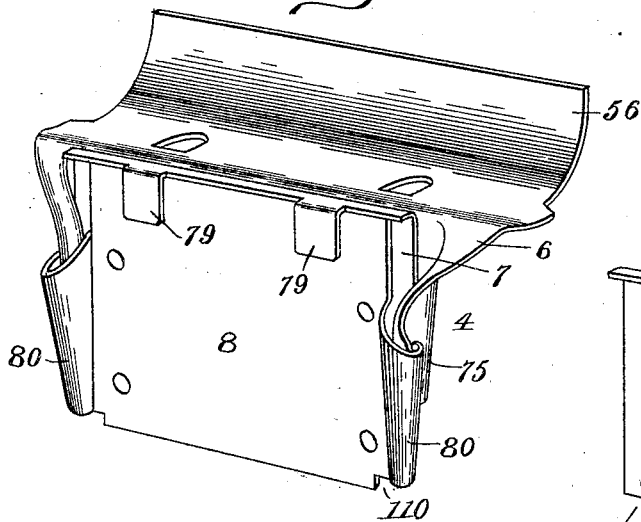
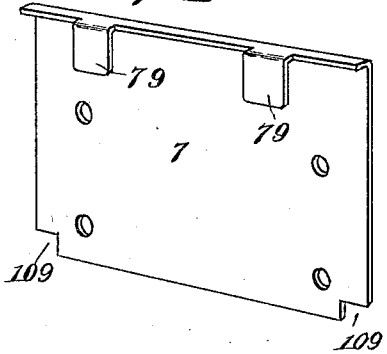
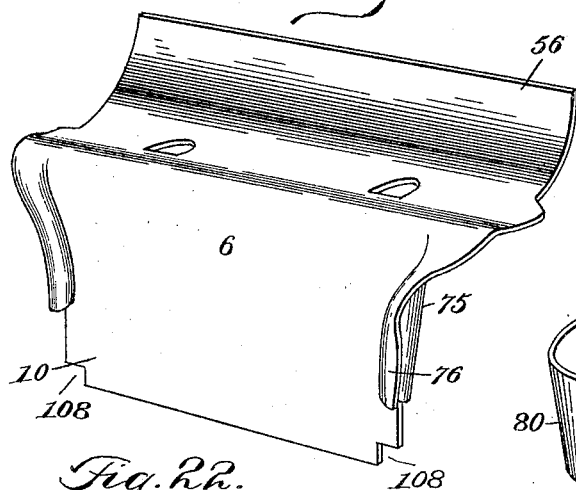
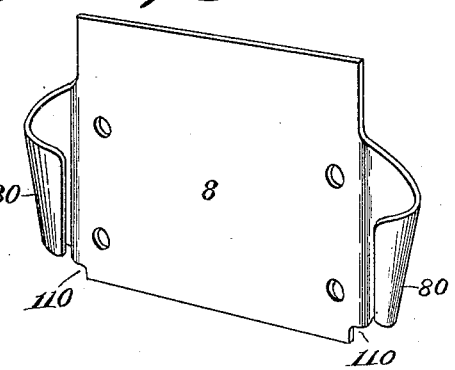
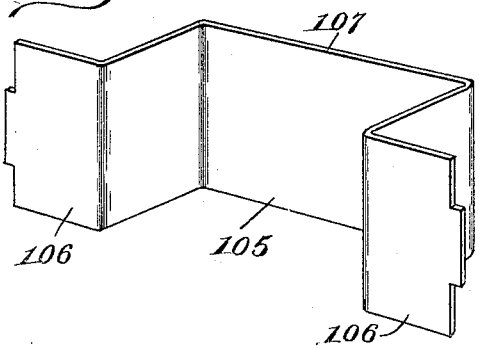

UNITED STATES PATENT OFFICE.

ALEXANDER NELSON, OF NEWARK, NEW JERSEY, AND BENJAMIN B. AVERY, OF NEW YORK, N. Y., ASSIGNORS, BY MESNE ASSIGNMENTS, TO GERMPROOF CUP CORPORATION, OF NEW YORK, N. Y., A CORPORATION OF NEW YORK.

MACHINE FOR MANUFACTURING AND VENDING SANITARY DRINKING-CUPS.

1,341,836.  Specification of Letters Patent.  Patented June 1, 1920.

Application filed May 10, 1919. Serial No. 296,083.

*To all whom it may concern:*

Be it known that we, ALEXANDER NELSON and BENJAMIN B. AVERY, both citizens of the United States, residing at Newark, Essex county, State of New Jersey, and New York city, county and State of New York, respectively, have invented certain new and useful Improvements in Machines for Manufacturing and Vending Sanitary Drinking-Cups, of which the following is a specification.

This invention relates to machines for manufacturing and dispensing sanitary drinking cups, the object of the invention being to provide an improved machine of this class, small, compact, comparatively inexpensive, simple, and a rapidly operating machine which can be readily installed in an office, public place or wherever desired at very low cost whereby the user by a very simple manipulation of the machine can quickly make a sanitary drinking cup for immediate use.

It may be said before describing this machine, that the machine has proven a practical success, many thousands of them having been contracted for, each machine being manufactured at comparatively small expense, so that it can be retailed for a comparatively small sum, and by means of which each machine can make five hundred or more cups from a single roll of paper, so that all that is necessary when a sanitary drinking cup is desired is to merely turn the handle or crank whereupon a blank will be drawn from the paper roll, severed, transformed into a cup and ejected ready for use in about a second, and this by the mere turning of the handle of the machine.

In the present improvement, the cup manufactured by the machine is a sanitary drinking cup in every sense of that word, in view of the fact that there is no handling of the cup or of the paper from which the cup is made after the roll is placed in the machine, until the cup is ejected into the hands of the user thereof, and as the machine is completely inclosed in the casing, there is no opportunity to touch or handle the paper from which the cup is made or the cup during its manufacture.

The present improved machine is an improvement in part upon the Powers Patent No. 1,077,298 owned by the company having also the ownership of the present improvement, it very much simplifying that machine aside from the fact that it does away with all coin controlled mechanism, which is one of the features of that machine, and many other operating elements shown in that machine, while making a very much improved cup and one in which the edges are more efficiently locked against separation.

The former used in making the cup and the cup made therefrom is similar in all important respects to those shown in the contemporaneously pending application of the same parties, Serial No. 226,596, filed April 4, 1918.

Figure 12:
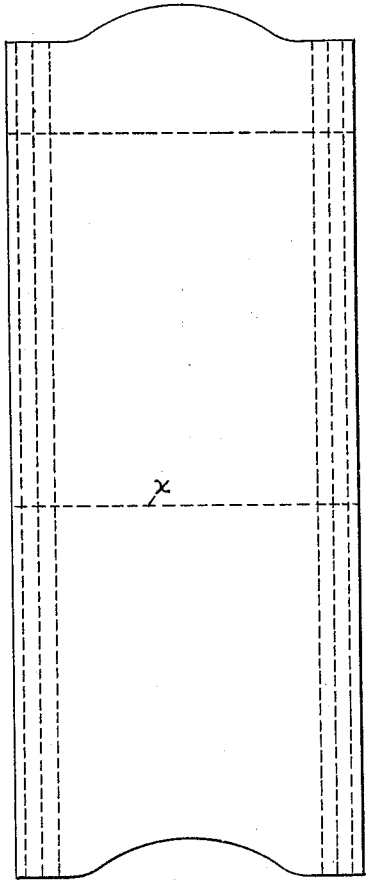
Figure 9:
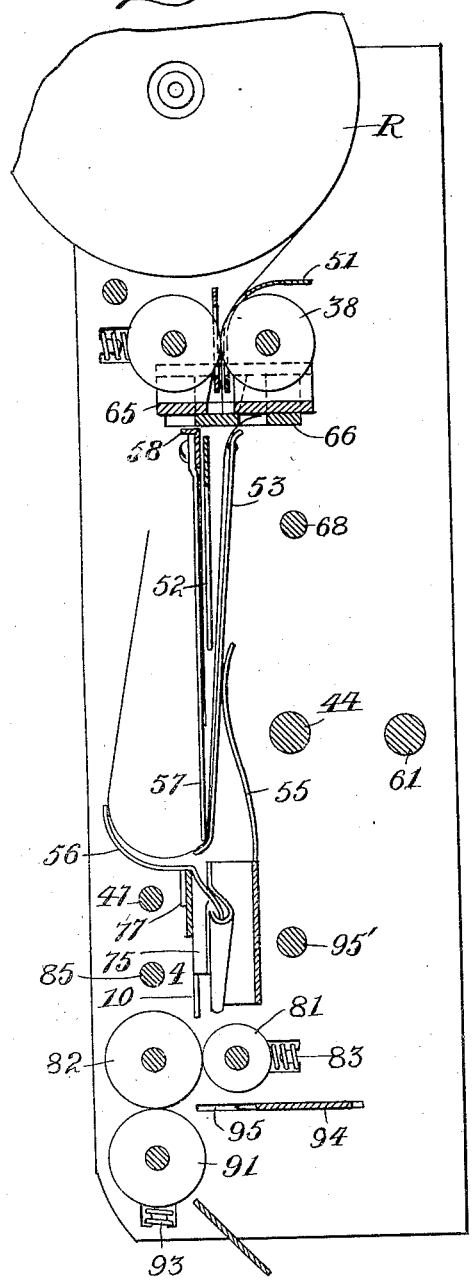
Figure 10:
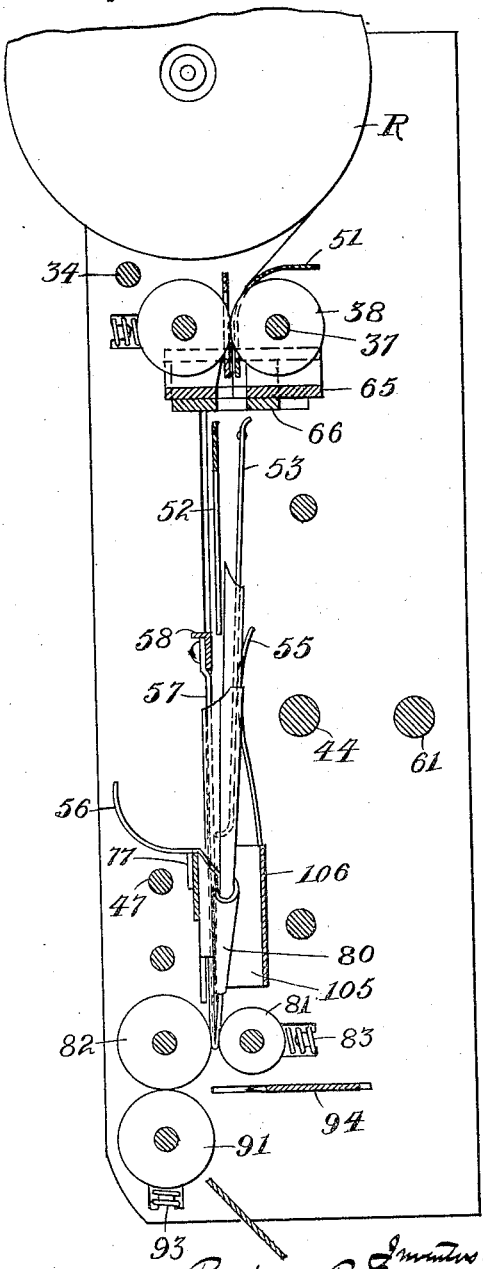
Figure 11:
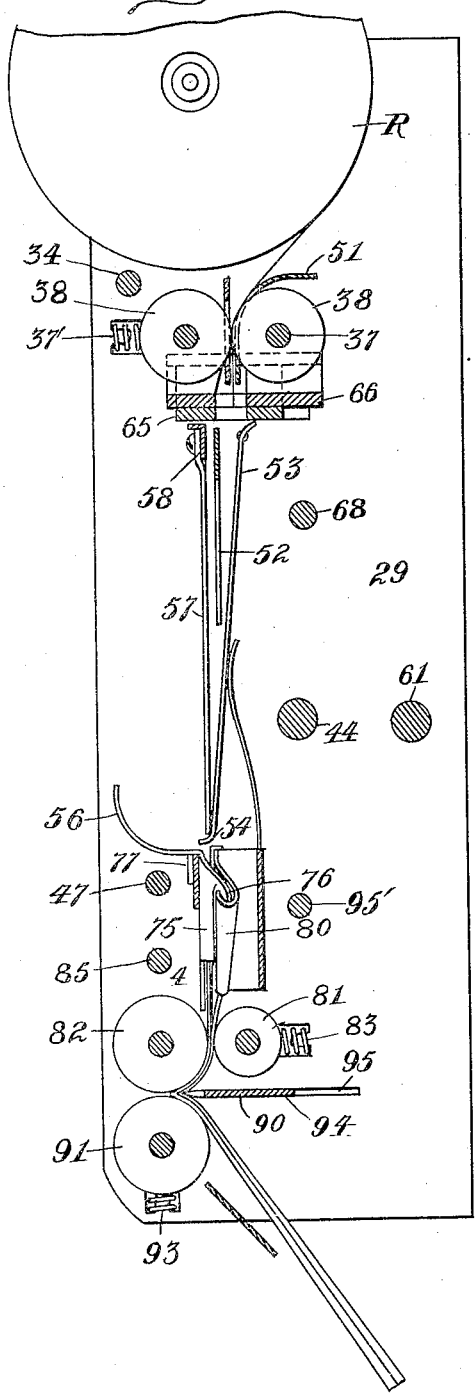
Figure 16:
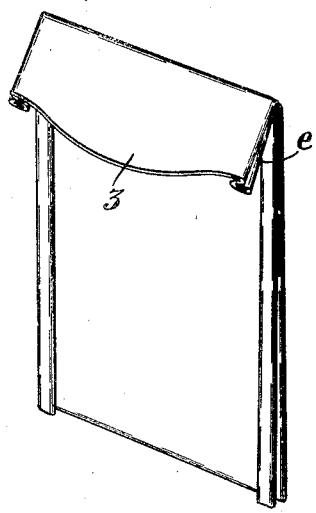
Figure 17:
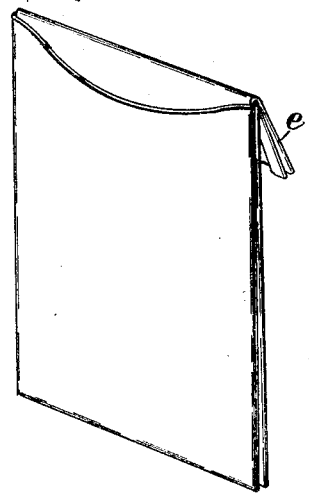

In the drawings accompanying and forming a part of this specification, Figure 1 is a front view of this improved machine with the cover or front of the casing removed, the machine itself being but slightly larger than this Fig. 1; Fig. 2 is a right hand side view of Fig. 1 with the side of the casing however, removed; Fig. 3 is a left hand side view of Fig. 1 likewise having the side of the casing removed; Fig. 4 is a vertical sectional view taken on the line 4—4 Fig. 1; Fig. 5 is a vertical sectional view taken on the line 5—5 Fig. 1; Fig. 6 is a vertical sectional view taken on the line 6—6 Fig. 1; Figs. 7, 8, 9, 10 and 11 are vertical sectional views taken on line 7—7 Fig. 1, and illustrate the different steps in the manufacture of the cup, Fig. 7 showing the paper as it is first drawn from the roll to form a cup blank, Fig. 8 showing the blank in readiness for the transverse fold and in readiness for severing it from the roll, Fig. 9 illustrating the plunger in position to carry the blank through the former, Fig. 10 illustrating the blank being carried through the former and its side edges folded, and Fig. 11 the blank after it is carried through the former into position to have the locking flap turned over the folded side edges; Fig. 12 illustrates the cup blank, the dotted lines illustrating the lines of fold; Fig. 13 illustrates the first step in the folding of the side edges of the cup blank; Fig. 14 illustrates the second step in the folding of such cup blank; Fig. 15 illustrates the third step; Figs. 16 and 17 illustrate the final step or completion of the cup, the first figure being a perspective view of the front of the cup and Fig. 17 a perspective view of the back of the cup, the side edges not being shown compressed tightly in order to more clearly illustrate the manner in which the side edges are folded; Fig. 18 is a perspective view of the former; Fig. 19 is a perspective view of one member thereof detached; Fig. 20 is a perspective view of another member thereof detached; Fig. 21 is a perspective view of the third or intermediate member of the three-fold or three-part former; and Fig. 22 is a perspective view of bracket or supporting means for supporting the former in the machine or its casing.

Similar characters of reference indicate corresponding parts in the several figures of the drawings.

The operating parts of the machine are all compactly inclosed in a casing 20 comprising a back plate 21 and a pair of forwardly projecting side plates or walls 22. The back plate and side walls may be formed of sheet metal and therefore as an integral structure. The back plate can be suitably secured by screws or other fastening to the wall or other support to which it is desired to attach the machine. For completely inclosing the mechanism within the casing, it is provided with a front or cover 23 of suitable curved form not only to conform to the inclosed mechanism but to also give the casing a neat and ornamental appearance. This cover 23 is suitably but detachably connected to the back plate 21 and may be provided with a suitable lock if desired for locking it thereto. In the present instance, the top of the cover is provided with a hooked or bent edge 25 adapted to be received in the bent-over edge 26 of the back plate whereby the cover may be swung up or down or detached as desired. The lower inner wall of the cover is provided with a pair of hooks 27 adapted to automatically catch into one of the cross members or bars 28 connecting the sides of the casing, these hooks forming latches whereby when the cover is sprung into position it will be automatically latched closed.

Carried within the casing and readily detachable therefrom when desired is the cup-forming mechanism, all of this mechanism being carried by a pair of side plates 29 suitably braced and supported at the rear and in the front, and these supporting side walls may be supported within the casing in any suitable way found most desirable in practice, so that as stated, the entire mechanism may be easily withdrawn from the casing when desired for any purpose.

In the present instance these plates 29 are provided with a pair of outwardly bent tongues 30 in position to be hooked into a pair of hooks or projections 31 carried by the side walls of the casing (see Figs. 1 and 2). Pivotally supported on the side plates 29 is a suitable paper roll supporting bracket 32 which, by reason of its pivotal support, can be readily drawn forward for the removal or insertion of a roll when the casing front is swung upward or removed, the casing front being suitably curved as at 23' to conform to the shape of the roll. When the roll of paper is in position in the casing it is maintained in that position by the front of the casing. The paper roll bracket comprises a pair of upright arms 33 carried by a shaft 34 pivotally secured to the side plates, the arms having at their upper forward ends thumb pieces 35 for the manipulation of the bracket. The arms are also provided with thumb pieces 35' whereby the arms may be sprung apart, they being formed of resilient material to permit the removal of a core or the insertion of a new roll of paper. The roll R may be supported between these arms in any suitable way but preferably by means of a paper roll core. Each of these arms 33 carries a stud 35'', one of which will preferably be larger than the other to conform to the axial opening in the paper core whereby the insertion of the core with its roll of paper can be only accomplished in the proper manner.

Located on a pair of shafts 37 below the paper roll are two pairs of spaced knurled rollers 38, between which the free edge of the paper web passes and by means of which it is fed into position to be transversely folded. One of these shafts is spring-pressed toward the other by springs 37', the shaft being located in suitable slots of the side plates 29 for this purpose, whereby the knurled rolls may give to accommodate the various thicknesses of the paper. These knurled rollers and their shafts are rotated by a pair of gears 39, one on each shaft, one of said shafts also having a pinion gear 40 in mesh with an intermediate gear 41 carried by an intermediate shaft 42, all the shafts just described and hereafter described being mounted in the side plates 29. The gear 41 is in position to be operated at a certain time by what may be described herein as an intermittent gear 43 carried by a shaft 44, as this gear has only a certain number of teeth around its periphery, a part of such periphery being without teeth. On the same shaft 44 carrying the intermittent gear 43 is located a large gear 45, which is in mesh with a driving gear 46 carried by a shaft 47, one end of which extends through a side wall of the casing and carries a handle 48 whereby on the rotation of this handle by the user the several meshing gears will be operated in a manner that will be obvious. For preventing the rotation of the intermediate gear 41 except when the teeth of the intermittent gear 43 are in engagement therewith, the gear 41 is provided with a plate 49 secured thereto, and which is in position to engage the smooth rim 49' of a cam member hereinafter described as the teeth of the intermittent gear 43 leave the teeth of the intermediate gear 41. This member 49 thus acts as a brake to prevent any frictional movement of the gear 41. For guiding the paper to the knurled rolls 38 a pair of guide plates 50 and 51 are provided suitably secured to the side plates, the guide plate 51 being in the form of a curved apron, and both of these plates are provided with slots through which the edges of the knurled rolls work. Located below the rolls is a fixed guide plate or member 52 also supported by the side plates at its upper end and tapering toward its lower end. Coöperating with this fixed guide plate 52 is a hinged or swinging guide plate 53 swingingly supported at its upper end by the side plates and provided at its lower end with a curved portion 54 for directing the edge of the blank or web toward the front or to the left of the machine (see Fig. 7). This guide plate 53 is maintained in position by a spring 55 but is capable of being pushed backward or rearwardly by the action of the plunger hereinafter described as it forces the cup blank into the former. As the web or paper passes down through the knurled rolls 38 and between the guide plates 52 and 53 the lower or free edge of the web is deflected to the left by the curved portion 54 of the guide plate 53 and on to a curved apron 56 of the former hereinafter described whereby this free edge is turned upward the required distance to form the transverse fold of the cup, it being turned up and around the lower edge of a movable plunger shown in the form of a plate 57. This plunger plate is supported at its top by a cross bar 58 sliding in a pair of vertical slots of the side plates and this cross bar is provided with a pair of depending racks 59 at the outside of the side plates, the lower ends of which are suitably guided by guide projections, and these racks are in position to be engaged by a pair of segmental gears 60 fixedly secured to a rock shaft 61, and one of these segmental gears (see Fig. 5) is provided with a pin 62 working in a cam slot or groove 63 of the cam member 64, which is secured to the inside of the intermittent gear 43, which is likewise secured to the large gear 45, so that this cam 64, intermittent gear 43 and large gear 45 all operate together and as one member, and it is this cam 64 that has the smooth rim 49' with which the brake 49 coöperates as hereinbefore described, the said cam also having cutaway portions 59' adjacent the point where the gear teeth of the intermittent gear 43 are brought into mesh with the teeth of the gear 41. Therefore as the handle is turned the plunger plate will be shifted up and down, but as the paper or web is brought into position to be projected forward and upward by the curved portions 54 and 56 it will be as before stated, turned around the lower edge of the plunger plate, which is maintained in this position until the free edge of the paper has been carried sufficiently far upward to form the desired size of cup, at which time, by means of the segmental gears the plunger plate will be carried downward to form the transverse fold and push the blank into the former and carry it sufficiently far therethrough for the knurled rollers hereinafter described to engage the same and continue the movement of the cup. At about the time the plunger is ready to push the blank through the former the transversely folded blank is severed from the roll or web of paper. This is accomplished by a suitable cutting mechanism comprising a fixed blade 65 carried by the side plates and a horizontally movable cutting knife or blade 66 supported for horizontal movement in a pair of horizontal slots of the side plate. These blades are shown of curved form whereby the cut will be of convex form. The movable blade is operated by a pair of levers 67 carried on a rock shaft 68 supported by the side plates and one of these levers is longer than the other as at 69 (see Fig. 6) and is provided with a stud 70 coöperating with a cam slot or groove 71 carried by a cam 72 mounted on the shaft 44, this being the same shaft which carries the intermittent gear 43, cam 64 and main gear 46, but this cam 72 is located at the opposite side from the main gear (see Fig. 6). Supported below the curved portion 54 of the guide plate 53 is located the former 4 for bending and infolding the side edges of the transversely folded blank as it is pushed therethrough by the shiftable plunger 57. This improved former comprises three members or plates 6, 7 and 8, the member 7 forming the middle plate of the series while the members 6 and 8 form the two outside plates of the former. The member 6 is provided with the curved apron 56 hereinbefore described for directing and guiding one end of the cup blank in the manner before stated. This apron 56 extends transversely or at an angle to the former portion proper and is preferably formed integral therewith. The member 6 comprises a flat back portion 10 having at each side thereof below the apron portion an inwardly bent side edge 75, which at a suitable point in its length is also bent backwardly as at 76. These bent side edges form the means for giving the side edges of the cup blank the first fold inwardly upon the blank and also for shaping the remaining folds of the side edges of the blank. The apron portion of the member 6 is slotted and the cutout portions thereof are bent downward as at 77 to form suitable means for holding the former in position on a cross bar extending between the plates. The back portion of the former 6 is notched at its lower edge. Co-operating with this former member is the middle former member 7 likewise provided with a pair of bent projections 79 adapted to extend over the upper edge of the former plate 8. This middle former plate 7 has its side edges extending into the bent edges of the first former member and it is between these two former members that the cup blank passes and it is around the side edges of this middle former that the side edges of the cup blank are first folded. Suitably secured to this former member by suitable screws is the third former member 8 and this member has its side edges bent or curled as at 80, so as to taper from their upper ends to their lower ends so that they somewhat resemble the curled petals of some well known flowers. In other words, the curl is greater or tighter at the lower ends of the curled portions than at the upper ends thereof, and when properly positioned, it being as before stated, suitably secured by screws or by rivets if preferred, to the metal former plate 7, the curled side edges of this plate 8 are in position to have the upper portions thereof overlap portions of the bent side edges of the former plate 6. In fact, the edges of the curled portions of the plate 8 project between the folds of the bent portions of the plate 6 in such manner that the cup blank as it passes through the former will first have its side edges bent toward each other by the former member 6 giving a wide fold. As the blank passes farther through the former the curled side edges of the former 8 make a narrow fold of each free edge of the blank, folding this edge backwardly over the bent side edges of the former member 6 and as the cup blank further passes through the former the lower curled portions of the former 8 infolds as it were, the narrow bent edges of the blank upon the first folded portion of the blank. In other words, as the cup passes into the machine it is first folded along the dotted line $x$ Fig. 12, and by means of this fold and the plunger or pusher 57 the cup blank is then passed into and through the former. As it passes into the former a wide fold $a$ (see Fig. 13) is given to the cup. As it further passes through the former a narrow fold $b$ (see Fig. 14) is given to the cup and this narrow fold is then inturned or infolded, that is, folded upon one-half of the first fold $a$ as at $c$ Fig. 15, except that the fold is considerably tighter than as shown in Fig. 15, it being left in this condition for the purposes of illustration.

The three former plates are suitably supported by a U-shaped bracket 105 (see Fig. 22), the ends of which 106 project into the side plates 29 and it is over the edge 107 of this bracket that the projections 79 of the former plate 7 extend.

It will be observed that the corners of the three former plates are suitably notched as at 108, 109, 110 to facilitate the proper feeding of the cup through the machine.

The lower end of the blank is pushed by the plunger 57 sufficiently far through the former for the lower end of the blank to be engaged by suitable knurled rollers 81 and 82, one of which is likewise spring-pressed by suitable springs 83 toward and from the other to compensate for different thicknesses of the cup. These knurled rollers are rotated by a gear 84 in mesh with the gear 46 rotated by the handle shaft 47 hereinbefore referred to. This gear 84 is carried on a shaft 85, on which is also fixed a companion gear 86 in mesh with a gear 87 on one of the knurled roller shafts, and which gear 87 in turn is in mesh with a gear 88 on the other knurled roller shaft. By means of these knurled rollers the folded cup is not only pulled through the machine, but the folded side edges thereof are compressed and crimped so as to insure the proper locking thereof.

In this improved cup however, the front and back are so formed that one side, as the front, is longer than the other thereby to provide a locking flap 3, which also forms a smooth mouthpiece for the cup. After the cup blank has passed almost through the knurled rollers 81 and 82 a horizontal reciprocating tucker or flap folder 90 engages the flap portion 3 of the cup blank and pushes it horizontally between the knurled roller 82 and a similar roller 91, which is rotated by means of a gear 92 in mesh with the gear 87 of the roller 82. This knurled roller 91 is likewise spring-pressed by means of suitable springs 93 toward the knurled roller 82 to likewise compensate for different thicknesses of the cup. The horizontal flap folder comprises a suitable plate 94 supported in horizontal slots 95 of the side plates 29 and is provided with a suitable edge adapted to engage the flap at the proper point, and then push the cup horizontally between the knurled rollers 82 and 91, the rotation of which carries the cup therethrough and discharges the same through a suitable slot in the front wall of the casing. For operating this flap folder a rock shaft 95' is mounted in the side plates 29 and the flap folder is connected thereto by a pair of levers or arms 96 and 97. The arm 97 is longer than the arm 96 and is provided with a stud or roller 98 located in a cam slot 99 of a cam 100, mounted on the same shaft that carries the cam 72 and therefore the main gear 45, and its other related parts. By this means the flap folder is reciprocated back and forth as the handle shaft 47 is rotated by a suitable detachable handle 48.

Thus it will be seen that the flap 3 when it is bent over the front of the cup in the manner shown in Figs. 16 and 17, forms a lock for the side edges as well as a smooth mouth edge for the cup and this lock is more efficient by reason of the fact that the same folds which are given to the side edges of the front and back of the cup as it passes through the former are also given to the flap (see e Figs. 16 and 17). In other words, both the side edges of the cup proper, as well as the flap, are simultaneously folded so that when the flap is folded down it materially assists in locking the folds of the cup proper or body in place and this more efficiently than would be the case if the side edges of the flap were not folded with those of the body.

From the foregoing, it will be observed that the web of paper from the roll R is fed downward by a pair of knurled rollers 38 into position to have the free edge thereof projected by the apron 56 around and upwardly relatively to the plunger 57, and at the proper time the blank is severed from its web by the horizontally movable cutting knife hereinbefore described, whereupon the movable plunger 57 pushes the transversely folded blank into and through the former, whereupon the side edges thereof are folded and infolded in the manner hereinbefore described, and such side edges compressed and crimped by the knurled rollers 81 and 82 and as the almost completed cup is about to pass from the knurled rollers 81 and 82 the flap 3 thereof at its juncture point with the front of the cup is engaged by a horizontally movable tucker or flap folder and pushed through the knurled rollers 82 and 91 thereby to bend the flap on to the front of the cup and also carry the complete cup into the hands of the user. It will be observed as hereinbefore stated that the former not only folds the side edges of the cup body proper a plurality of times but that the side edges of the flap are also similarly folded and that such side edges of the cup flap are also crimped as they pass between the rollers 81 and 82 in a similar manner to the folded side edges of the cup body as it passes through the same rollers 81 and 82. The folding of the side edges of the cup flap thus materially assists in maintaining the side edges of the cup body locked and the crimping of the side edges of the body and of the flap also helps to maintain the folded side edges tightly folded. Furthermore, as the flap is folded down by the rolls 82 and 93, the side edges of the flap and of the body are again crimped by rolls 82 and 91 during the passage of the folded flap between said rolls. All of these operations take place in proper sequence and in such an effective manner that a cup is severed and in the hands of a user in about a second of time.

It will be observed from the foregoing, that the vertically moving plunger 57 not only transversely folds the cup blank, but also constitutes the means for pressing or pushing the blank into and practically through the former sufficiently far to enable the lower end thereof to be engaged by the knurled rollers 81 and 82 by reason of the fact that the plunger exerts its pressure upon the transverse fold of the cup blank, while the tucker or flap folder 93 operates transversely of the direction of movement of the plunger 57 and that by means of the former which gives three folds to the blank at each side thereof, the necessity of using feeding and pressure rollers for folding and feeding the edges of the cup blank is avoided as in the Powers patent hereinbefore referred to, while a better locking of the blank is also obtained.

In the form of former shown herein it will be observed that the bent side edges of the member 6 have what may be considered as an ogee or S shaped bend, the bend nearest the plate 10 constituting the means for giving the first fold to the blank while the top or outward bend constitutes the means around which the narrow fold b is made by the former member 8 while the lower curled portion of the member 8 produces the final infolding of the blank.

In practice the roll of paper will be in one continuous web of paper or other suitable thin material, either of paraffin paper or otherwise as may be found desirable, a suitable amount being severed therefrom each time to form an individual cup comprising the back and the front and the locking flap, the sides of the cup being so folded and locked by the flap that the necessity of using paste or any other means for holding the edges of the cup together is entirely avoided.

It will be understood that the various details may be more or less changed without departing from the spirit or scope of the present improvement.

We claim as our invention:

1. In a machine for manufacturing sanitary drinking cups, the combination of means for feeding a web of paper in one direction, means for deflecting a part thereof upwardly upon such web, means for folding and infolding the side edges of the web throughout the length of the cup, and means around which the web is deflected and by means of which it is transversely folded and pushed into and through the folding and infolding means.

2. In a machine for manufacturing sanitary drinking cups, the combination of means for feeding a web of paper in one direction, means for deflecting a part thereof upwardly upon such web, means for folding and infolding the side edges of the web throughout the length of the cup, and means around which the web is deflected and by means of which it is transversely folded and pushed into and through the folding and infolding means, said deflecting means including a swinging guide member.

3. In a machine for manufacturing sanitary drinking cups, the combination of means for feeding a web of paper in one direction, means for deflecting a part thereof upwardly upon such web, means for folding and infolding the side edges of the web throughout the length of the cup, and means around which the web is deflected and by means of which it is transversely folded and pushed into and through the folding and infolding means, said deflecting means including a swinging guide member having a lower curved edge.

4. In a machine for manufacturing sanitary drinking cups, the combination of means for feeding a web of paper in one direction, means for deflecting a part thereof upwardly upon such web, means for folding and infolding the side edges of the web throughout the length of the cup, and means around which the web is deflected and by means of which it is transversely folded and pushed into and through the folding and infolding means, said deflecting means including a swinging guide member having a lower curved edge and a curved apron coöperating therewith.

5. In a machine for manufacturing sanitary drinking cups, the combination of means for feeding a web of paper in one direction, means for deflecting a part thereof upwardly upon such web, means for folding and infolding the side edges of the web throughout the length of the cup, and means around which the web is deflected and by means of which it is transversely folded and pushed into and through the folding and infolding means, said deflecting means including a swinging guide member having a lower curved edge and a curved apron coöperating therewith and connected with the folding and infolding means.

6. In a machine for manufacturing sanitary drinking cups, the combination of means for feeding a web of paper in one direction, means for deflecting a part thereof upwardly upon such web, means for folding and infolding the side edges of the web throughout the length of the cup, and means around which the web is deflected and by means of which it is transversely folded and pushed into and through the folding and infolding means, said deflecting means including a swinging guide member having a lower curved edge and a curved apron coöperating therewith and connected with the folding and infolding means and shiftable by the means for pushing the web through the folding and infolding means.

7. In a machine for manufacturing sanitary drinking cups, the combination of means for feeding a web of paper in one direction, means for deflecting a part thereof upwardly upon such web, means for folding and infolding the side edges of the web throughout the length of the cup, means around which the web is deflected and by means of which it is transversely folded and pushed into and through the folding and infolding means, and means for severing the web to form a cup blank prior to the pushing thereof through the folding and infolding means.

8. In a machine for manufacturing sanitary drinking cups, the combination of means for feeding a web of paper in one direction, means for deflecting a part thereof upwardly upon such web, means for folding and infolding the side edges of the web throughout the length of the cup, means around which the web is deflected and by means of which it is transversely folded and pushed into and through the folding and infolding means, and means for severing the web to form a cup blank prior to the pushing thereof through the folding and infolding means, said severing means operative in a direction transverse to the direction of movement of the means for pushing the web through the folding and infolding means.

9. In a machine for manufacturing sanitary drinking cups, the combination of means for feeding a web of paper in one direction, means for deflecting a part thereof upwardly thereby to form a pair of flat sides one longer than the other, severing means for severing the web thereby to form a cup blank, a former for folding and infolding the side edges of the blank throughout the length of the cup, shiftable means for transversely folding the blank and simultaneously pushing it through the former, and means for folding a flap over the folded side edges of the blank.

10. In a machine for manufacturing sanitary drinking cups, the combination of means for feeding a web of paper in one direction, means for deflecting a part thereof upwardly thereby to form a pair of flat sides one longer than the other, severing means for severing the web thereby to form a cup blank, a former for folding and infolding the side edges of the blank throughout the length of the cup, shiftable means for transversely folding the blank and simultaneously pushing it through the former, and means for folding a flap over the folded side edges of the blank, said severing means being operative in a direction transverse to the direction of movement of said pushing means.

11. In a machine for manufacturing sanitary drinking cups, the combination of means for feeding a web of paper in one direction, means for deflecting a part thereof upwardly thereby to form a pair of flat sides one longer than the other, severing means for severing the web thereby to form a cup blank, a former for folding and infolding the side edges of the blank throughout the length of the cup, shiftable means for transversely folding the blank and simultaneously pushing it through the former, and means for folding a flap over the folded side edges of the blank, said flap folding means being operative in a direction transverse to the direction of movement of said pushing means.

12. In a machine for manufacturing sanitary drinking cups, the combination of means for feeding a web of paper in one direction, means for deflecting a part thereof upwardly thereby to form a pair of flat sides one longer than the other, severing means for severing the web thereby to form a cup blank, a former for folding and infolding the side edges of the blank, shiftable means for transversely folding the blank and simultaneously pushing it through the former, and means for folding a flap over the folded side edges of the blank, both said severing means and flap folding means being operative in a direction transverse to the direction of movement of said pushing means.

13. In a machine for manufacturing sanitary drinking cups, the combination of means for feeding a web of paper in one direction, means for deflecting a part thereof upwardly thereby to form a pair of flat sides one longer than the other, severing means for severing the web thereby to form a cup blank, a former for folding and infolding the side edges of the blank, shiftable means for transversely folding the blank and simultaneously pushing it through the former, and means for folding a flap over the folded side edges of the blank, both said severing means and flap folding means being operative in a direction transverse to the direction of movement of said pushing means and also shiftable in opposite directions to each other.

14. In a machine for manufacturing sanitary drinking cups, the combination of means for supporting a roll of paper, means for feeding the paper downwardly and upwardly, a former for folding the side edges thereof a plurality of times throughout the length of the cup, and a shiftable plunger around which the paper is transversely folded and by means of which it is pushed into the former.

15. In a machine for manufacturing sanitary drinking cups, the combination of means for supporting a roll of paper, means for feeding the paper downwardly and upwardly, a former for folding the side edges thereof a plurality of times, a shiftable plunger around which the paper is transversely folded and by means of which it is pushed into the former, means for feeding the cup from the former, and means for folding and locking a flap over the folded side edges of the cup.

16. In a machine for manufacturing sanitary drinking cups, the combination of means for supporting a roll of paper, means for feeding the paper downwardly and upwardly, a former for folding the side edges thereof a plurality of times throughout the length of the cup, a shiftable plunger around which the paper is transversely folded and by means of which it is pushed into the former, and means for severing a cup blank from the web of paper before it is pushed through the former.

17. In a machine for manufacturing sanitary drinking cups, the combination of means for supporting a roll of paper, means for feeding the paper downwardly and upwardly, a former for folding the side edges thereof a plurality of times, a shiftable plunger around which the paper is transversely folded and by means of which it is pushed into the former, means for feeding the cup from the former, means for folding and locking a flap over the folded side edges of the cup, and means for severing a cup blank from the web of paper before it is pushed through the former.

18. In a machine for manufacturing sanitary drinking cups, the combination of means for supporting a roll of paper, means for feeding the paper downwardly and upwardly, a former for folding the side edges thereof a plurality of times throughout the length of the cup, a shiftable plunger around which the paper is transversely folded and by means of which it is pushed into the former, and a pair of guide plates coöperating with said plunger.

19. In a machine for manufacturing sanitary drinking cups, the combination of means for supporting a roll of paper, means for feeding the paper downwardly and upwardly, a former for folding the side edges thereof a plurality of times throughout the length of the cup, a shiftable plunger around which the paper is transversely folded and by means of which it is pushed into the former, and a pair of guide plates coöperating with said plunger, one swingingly supported for shiftable movement by said plunger.

20. In a machine for manufacturing sanitary drinking cups, the combination of means for supporting a roll of paper, means for feeding the paper downwardly and upwardly, a former for folding the side edges thereof a plurality of times throughout the length of the cup, a shiftable plunger around which the paper is transversely folded and by means of which it is pushed into the former, and a pair of guide plates coöperating with said plunger, one swingingly supported for shiftable movement by said plunger and having a curved lower edge for deflecting the paper.

21. In a machine for manufacturing sanitary drinking cups, the combination of means for supporting a roll of paper, means for feeding the paper downwardly and upwardly, a former for folding the side edges thereof a plurality of times throughout the length of the cup, a shiftable plunger around which the paper is transversely folded and by means of which it is pushed into the former, and a pair of guide plates coöperating with said plunger, one swingingly supported for shiftable movement by said plunger and having a curved lower edge for deflecting the paper, said former also having a curved apron coöperating with said curved lower edge.

22. In a machine for manufacturing sanitary drinking cups, the combination of means for supporting a roll of paper, means for feeding the paper downwardly and upwardly, a former for folding the side edges thereof a plurality of times throughout the length of the cup, a shiftable plunger around which the paper is transversely folded and by means of which it is pushed into the former, and means for crimping the folded edges of the blank as it leaves the former.

23. In a machine for manufacturing sanitary drinking cups, the combination of means for supporting a roll of paper, means for feeding the paper downwardly and upwardly, a former for folding the side edges thereof a plurality of times, a shiftable plunger around which the paper is transversely folded and by means of which it is pushed into the former, means for crimping the folded edges of the blank as it leaves the former, and means for folding a locking flap over the folded side edges as it leaves the crimping means.

24. In a machine for manufacturing sanitary drinking cups, the combination of means for supporting a roll of paper, means for feeding the paper downwardly and upwardly, a former for folding the side edges thereof a plurality of times, a shiftable plunger around which the paper is transversely folded and by means of which it is pushed into the former, means for crimping the folded edges of the blank as it leaves the former, and means for folding a locking flap over the folded side edges as it leaves the crimping means and comprising a horizontally movable flap folder.

25. In a machine for manufacturing sanitary drinking cups, the combination of means for feeding a web, means for deflecting said web upwardly, means for severing the web to form a blank, a stationary former for folding the side edges of the web a plurality of times, and a shiftable plunger around the lower edge of which the blank is transversely folded and by means of which it is pushed through the former.

26. In a machine for manufacturing sanitary drinking cups, the combination of means for feeding a web, means for deflecting said web upwardly, means for severing the web to form a blank, a stationary former for folding the side edges of the web a plurality of times and comprising a three-part former, and a shiftable plunger around the lower edge of which the blank is transversely folded and by means of which it is pushed through the former.

27. In a machine for manufacturing sanitary drinking cups, the combination of means for feeding a web, means for deflecting said web upwardly, means for severing the web to form a blank, a stationary former for folding the side edges of the web a plurality of times and comprising a plurality of plates having coöperating curved edges, and a shiftable plunger around the lower edge of which the blank is transversely folded and by means of which it is pushed through the former.

28. In a machine for manufacturing sanitary drinking cups, the combination of means for feeding a web, means for deflecting said web upwardly, means for severing the web to form a blank, a stationary former for folding the side edges of the web a plurality of times and comprising a plurality of plates having coöperating tapered curled edges, and a shiftable plunger around the lower edge of which the blank is transversely folded and by means of which it is pushed through the former.

29. In a machine for manufacturing sanitary drinking cups, the combination of means for feeding a web, means for deflecting said web upwardly, means for severing the web to form a blank, a stationary former for folding the side edges of the web a plurality of times and comprising a plurality of plates having coöperating tapered curled edges, and a shiftable plunger around the lower edges of which the blank is transversely folded and by means of which it is pushed through the former, the curled edges of one of said plates having an S-shaped bend.

30. In a machine for manufacturing sanitary drinking cups, the combination of means for feeding a blank downwardly in a vertical direction, means operative in a horizontal direction for severing the blank, a former, a shiftable plunger operative in a vertical direction, means operative to deflect the blank around the lower edge of the plunger thereby to transversely fold it around such plunger, and means for shifting the plunger thereby to carry the blank through the former.

31. In a machine for manufacturing sanitary drinking cups, the combination of means for feeding a blank downwardly in a vertical direction, means operative in a horizontal direction for severing the blank, a former, a shiftable plunger operative in a vertical direction, means operative to deflect the blank around the lower edge of the plunger thereby to transversely fold it around such plunger, means for shifting the plunger thereby to carry the blank through the former, and means operative in a horizontal direction for folding a flap over the folded edges of the blank.

32. A three-fold former for a cup-making machine, it comprising a member having an S-shaped bend at each side, a member having a tapered curled edge at each side, and an intermediate member.

33. A three-fold former for a cup-making machine, it comprising a member having an S-shaped bend at each side, a member having a tapered curled edge at each side, and an intermediate member one of said members having a curved apron.

34. A three-fold former for a cup-making machine, it comprising a member having an S-shaped bend at each side, a member having a tapered curled edge at each side, and an intermediate member, the member having the S-shaped bend at each side having a curved apron.

35. A three-fold former for a cup-making machine, it comprising a member having a substantially S-shaped bent edge at each side thereof each merging into a gradually curled portion at one end, a member having a tapered gradually curled portion at each side thereof a part thereof adapted to fit into the S-shaped bend of the first member, and an intermediate member between said members.

36. A three-fold former for a cup-making machine, it comprising a member having a substantially S-shaped bent edge at each side thereof, each merging into a gradually curled portion at one end, a member having a tapered gradually curled portion at each side thereof a part thereof adapted to fit into the S-shaped bend of the first member, and an intermediate member between said members, said first member and intermediate members having overhanging projections for the attachment of the former plates in position.

37. In a machine for manufacturing sanitary drinking cups, the combination of supporting means for the paper, means for feeding the paper downwardly therefrom, means for deflecting the paper thereby to provide a pair of flat sides, means shiftable in a vertical plane and around which the paper is deflected and by means of which it is pushed downwardly, means for severing the paper, and means for folding the side edges of the paper a plurality of times.

38. In a machine for manufacturing sanitary drinking cups, the combination of supporting means for the paper, means for feeding the paper downwardly therefrom, means for deflecting the paper thereby to provide a pair of flat sides, means shiftable in a vertical plane and around which the paper is deflected and by means of which it is pushed downwardly, means for severing the paper, means for folding the side edges of the paper a plurality of times, and means for folding a flap over such folded side edges.

39. In a machine for manufacturing sanitary drinking cups, the combination of means for supporting a continuous web of paper, means for feeding the paper in one direction, means for deflecting the paper thereby to form a pair of flat sides, means for severing the paper, means operative in the direction the paper is first fed for transversely folding it and further feeding it, and means for folding the side edges of the paper a plurality of times.

40. In a machine for manufacturing sanitary drinking cups, the combination of means for supporting a continuous web of paper, means for feeding the paper in one direction, means for deflecting the paper thereby to form a pair of flat sides one longer than the other, means for severing the paper, means operative in the direction the paper is first fed for transversely folding it and further feeding it, means for folding the side edges of the paper, and means for folding a flap from the longer side of said paper upon the folded side edges thereof.

41. In a machine for manufacturing sanitary drinking cups, the combination of means for supporting a continuous web of paper, means for feeding the paper in one direction, means for deflecting the paper thereby to form a pair of flat sides one longer than the other, means for severing the paper, means operative in the direction the paper is first fed for transversely folding it and further feeding it, means for folding the side edges of the paper, and means for folding a flap from the longer side of said paper upon the folded side edges thereof and operative in a direction transverse to the direction in which the paper is first fed.

42. In a machine for manufacturing sanitary drinking cups, the combination of means for feeding a web of paper in one direction, means for deflecting it and feeding a part thereof in the opposite direction, means for severing the web, means for then feeding the paper in its original direction and by means of which also the paper is transversely folded, and a former for folding the edges of the blank a plurality of times.

43. In a machine for manufacturing sanitary drinking cups, the combination of means for feeding a web of paper in one direction, means for deflecting it and feeding a part thereof in the opposite direction, means for severing the web, means for then feeding the paper in its original direction and by means of which also the paper is transversely folded, a former for folding the edges of the blank a plurality of times, and means for then folding a locking flap upon the folded side edges of the blank.

44. In a machine for manufacturing sanitary drinking cups, the combination of means for supporting a roll of paper, means for feeding the paper in one direction, means for severing a blank from the paper, means for deflecting a portion of the web thereby to form a pair of flat sides, shiftable means around which the paper is deflected and by means of which it is further fed in its original direction, and a former through which the paper is fed by said shiftable means and by means of which the side edges are folded a plurality of times.

45. In a machine for manufacturing sanitary drinking cups, the combination of means for supporting a roll of paper, means for feeding the paper in one direction, means for severing a blank from the paper, means for deflecting a portion of the web thereby to form a pair of flat sides, shiftable means around which the paper is deflected and by means of which it is further fed in its original direction, a former through which the paper is fed by said shiftable means and by means of which the side edges are folded a plurality of times, and means for crimping and feeding the folded blank from the former.

46. In a machine for manufacturing sanitary drinking cups, the combination of means for supporting a roll of paper, means for feeding the paper in one direction, means for severing a blank from the paper, means for deflecting a portion of the web thereby to form a pair of flat sides one longer than the other, shiftable means around which the paper is deflected and by means of which it is further fed in its original direction, a former through which the paper is fed by said shiftable means and by means of which the side edges are folded a plurality of times, means for crimping and feeding the folded blank from the former, and means for then folding a flap over the folded side edges of the paper.

47. In a machine for manufacturing sanitary drinking cups, the combination of means for supporting a roll of paper, means for feeding the paper in one direction, means for deflecting a portion thereof upwardly to form a pair of flat sides one longer than the other thereby to form a flap, shiftable means for transversely folding the paper and for further feeding it in its original direction, a former effective to fold the side edges of the paper and the flap a plurality of times, means for crimping such folded side edges, and means for then folding the flap with its folded side edges over upon the folded side edges of the blank.

48. In a machine for manufacturing sanitary drinking cups, the combination of means for supporting the paper, means for feeding it in one direction, means for deflecting it in another direction, and means comprising a shiftable plunger in position to engage the inside of the paper after it is deflected and fold the paper transversely to form a pair of flat sides and then effective to further feed the paper into position to have its side edges folded a plurality of times.

49. In a machine for manufacturing sanitary drinking cups, the combination of means for supporting the paper, means for feeding it, means for folding it transversely and further feeding it and comprising a shiftable plunger, a rack connected therewith, and means for shifting said rack.

50. In a machine for manufacturing sanitary drinking cups, the combination of means for supporting the paper, means for feeding it, means for folding it transversely and further feeding it and comprising a shiftable plunger, a rack connected therewith, and means for shifting said rack and comprising a segmental gear and a cam coöperating therewith.

51. In a machine for manufacturing sanitary drinking cups, the combination of means for supporting the paper, means for feeding it, means for folding it transversely and further feeding it and comprising a shiftable plunger, a rack connected therewith, means for shifting said rack and comprising a segmental gear and a cam coöperating therewith, and means including a handle for rotating said cam.

52. In a machine for manufacturing sanitary drinking cups, the combination of means for supporting a web of paper, intermittently operative means for feeding the web, means for deflecting the paper to form a pair of flat sides, a shiftable plunger around which the paper is deflected and by means of which it is further fed, and means for shifting said plunger and comprising a gear operated means.

53. In a machine for manufacturing sanitary drinking cups, the combination of means for supporting a web of paper, intermittently operative means for feeding the web, means for deflecting the paper to form a pair of flat sides, a shiftable plunger around which the paper is deflected and by means of which it is further fed, means for shifting said plunger and comprising a gear operated means including a rack, and an oscillating segmental gear.

54. In a machine for manufacturing sanitary drinking cups, the combination of means for supporting a web of paper, intermittently operative means for feeding the web, means for deflecting the paper to form a pair of flat sides, a shiftable plunger around which the paper is deflected and by means of which it is further fed, means for shifting said plunger and comprising a gear operated means including a rack, an oscillating segmental gear, and a rotatable cam for operating said segmental gear.

55. In a machine for manufacturing sanitary drinking cups, the combination of means for supporting a web of paper, intermittently operative means for feeding the web, means for deflecting the paper to form a pair of flat sides, a shiftable plunger around which the paper is deflected and by means of which it is further fed, means for shifting said plunger and comprising a gear operated means including a rack, an oscillating segmental gear, and a rotatable cam for operating said segmental gear, means for folding the edges of the cup blank a plurality of times, and means for folding a flap over the folded edges of the cup blank and comprising a flap folder and gear driven mechanism for shifting said flap folder.

56. In a machine for manufacturing sanitary drinking cups, the combination of means for supporting a web of paper, intermittently operative means for feeding the web, means for deflecting the paper to form a pair of flat sides, a shiftable plunger around which the paper is deflected and by means of which it is further fed, means for shifting said plunger and comprising a gear operated means including a rack, an oscillating segmental gear, and a rotatable cam for operating said segmental gear, means for folding the edges of the cup blank a plurality of times, means for folding a flap over the folded edges of the cup blank and comprising a flap folder and gear driven mechanism for shifting said flap folder, and a handle for feeding the blank, operating the plunger and the flap folder all in proper sequence.

57. In a machine for manufacturing sanitary drinking cups, the combination of means for supporting a roll of paper, intermittently operative feeding means for feeeding the paper in one direction, means for deflecting the paper thereby to form a pair of flat sides, and intermittently operative means for transversely folding and further feeding the paper in its original direction.

58. In a machine for manufacturing sanitary drinking cups, the combination of means for supporting a roll of paper, intermittently operative feeding means for feeding the paper in one direction, means for deflecting the paper thereby to form a pair of flat sides, intermittently operative means for transversely folding and further feeding the paper in its original direction, and intermittently operative blank severing means.

59. In a machine for manufacturing sanitary drinking cups, the combination of means for supporting a roll of paper, intermittently operative feeding means for feeding the paper in one direction, means for deflecting the paper thereby to form a pair of flat sides, intermittently operative means for transversely folding and further feeding the paper in its original direction, intermittently operative blank severing means, and stationary means for folding the side edges of the paper a plurality of times.

60. In a machine for manufacturing sanitary drinking cups, the combination of means for supporting a roll of paper, intermittently operative feeding means for feeding the paper in one direction, means for deflecting the paper thereby to form a pair of flat sides, intermittently operative means for transversely folding and further feeding the paper in its original direction, intermittently operative blank severing means, stationary means for folding the side edges of the paper a plurality of times, and intermittently operative means for folding a flap over the folded side edges of the blank.

61. In a machine for manufacturing sanitary drinking cups, the combination of means for supporting a roll of paper, intermittently operative feeding means for feeding the paper in one direction, means for deflecting the paper thereby to form a pair of flat sides, intermittently operative means for transversely folding and further feeding the paper in its original direction, intermittently operative blank severing means, stationary means for folding the side edges of the paper a plurality of times, intermittently operative means for folding a flap over the folded side edges of the blank, and manually operative means for driving each of said intermittently operative means in proper sequence.

62. In a machine for manufacturing sanitary drinking cups, the combination of means for supporting a roll of paper, intermittently operative feeding means for feeding the paper in one direction, means for deflecting the paper thereby to form a pair of flat sides, intermittently operative means for transversely folding and further feeding the paper in its original direction, intermittently operative blank severing means, stationary means for folding the side edges of the paper a plurality of times, intermittently operative means for folding a flap over the folded side edges of the blank, and manually operative means for driving each of said intermittently operative means in proper sequence and including gear driven rotary means and cams.

63. In a machine for manufacturing sanitary drinking cups, the combination of means for supporting a roll of paper, intermittently operative gear driven means for feeding the paper in one direction, cam operated means for severing a blank from the web of paper at a predetermined time and intermittently operated, means for deflecting the paper during the feeding thereof, and an intermittently operated gear and cam driven plunger for then forming a transverse fold in the paper and for further feeding it in its original direction.

64. In a machine for manufacturing sanitary drinking cups, the combination of means for supporting a roll of paper, intermittently operative gear driven means for feeding the paper in one direction, cam operated means for severing a blank from the web of paper at a predetermined time and intermittently operated, means for deflecting the paper during the feeding thereof, an intermittently operated gear and cam driven plunger for forming a transverse fold in the paper and for further feeding it in its original direction, a stationary former for folding the side edges of the blank a plurality of times, gear driven means for crimping the folded side edges, and gear driven cam operated means for folding a flap over the folded side edges of the blank.

65. In a machine for manufacturing sanitary drinking cups, the combination of means for supporting a roll of paper, intermittently operative gear driven means for feeding the paper in one direction, cam operated means for severing a blank from the web of paper at a predetermined time and intermittently operated, means for deflecting the paper during the feeding thereof, an intermittently operated gear and cam driven plunger for forming a transverse fold in the paper and for further feeding it in its original direction, a stationary former for folding the side edges of the blank a plurality of times, gear driven means for crimping the folded side edges, and gear driven cam operated means for folding a flap over the folded side edges of the blank, the first feeding means, the plunger, the severing means and the flap folding means all being directly driven in sequence from a single shaft.

66. In a machine for manufacturing sanitary drinking cups, the combination of shiftable roll supporting means, means for feeding a web of paper, means for transversely folding it, means for further feeding it, a former for folding the side edges thereof, and means for folding a locking flap over said folded side edges.

67. A portable machine adapted to be suspended from a side wall for manufacturing sanitary drinking cups comprising paper supporting means, paper feeding means, paper severing means, a transverse folding means, means for folding the side edges of the paper a plurality of times, means for folding a locking flap over the folded side edges of the paper, means for supporting all of said mechanisms, and a casing carrying and inclosing said supporting means and its supported mechanisms and having means for the delivery of a completed cup therefrom.

68. A portable machine adapted to be suspended from a side wall for manufacturing sanitary drinking cups comprising paper supporting means, paper feeding means, paper severing means, a transverse folding means, means for folding the side edges of the paper a plurality of times, means for folding a locking flap over the folded side edges of the paper, means for supporting all of said mechanisms, and a casing carrying and inclosing said supporting means and its supported mechanisms and having means for delivery of a completed cup therefrom, said casing having a swinging front cover to permit access to the mechanisms.

69. A portable machine adapted to be suspended from a side wall for manufacturing sanitary drinking cups comprising paper supporting means, paper feeding means, paper severing means, a transverse folding means, means for folding the side edges of the paper a plurality of times, means for folding a locking flap over the folded side edges of the paper, means for supporting all of said mechanisms, and a casing carrying and inclosing said supporting means and its supported mechanisms and having means for delivery of a completed cup therefrom, said casing having a swinging front cover detachable from said casing to permit access to the mechanisms.

70. In a machine for manufacturing sanitary drinking cups, the combination of paper roll supporting means, intermittently operative feeding means, means for deflecting the paper thereby to form a pair of flat sides one longer than the other, an intermittently operative severing means, an intermittently operative plunger effective to further feed the paper and thereby fold it transversely, a stationary former through which the plunger feeds the paper and effective to fold and infold the side edges of the paper, means for crimping the side edges, and intermittently operative means for folding a flap from the longer flat side of the paper upon the folded side edges of the blank.

71. In a machine for manufacturing sanitary drinking cups, the combination of paper roll supporting means, intermittently operative feeding means, means for deflecting the paper thereby to form a pair of flat sides one longer than the other, an intermittently operative severing means, an intermittently operative plunger effective to further feed the paper and thereby fold it transversely, a stationary former through which the plunger feeds the paper and effective to fold and infold the side edges of the paper, means for crimping the side edges, and intermittently operative means for folding a flap from the longer flat side of the paper upon the folded side edges of the blank, all of said means being manually operative in proper sequence.

72. In a machine for manufacturing sanitary drinking cups, the combination of paper roll supporting means, intermittently operative feeding means, means for deflecting the paper thereby to form a pair of flat sides one longer than the other, an intermittently operative severing means, an intermittently operative plunger effective to further feed the paper and thereby fold it transversely, a stationary former through which the plunger feeds the paper and effective to fold and infold the side edges of the paper, means for crimping the side edges, and intermittently operative means for folding a flap from the longer flat side of the paper upon the folded side edges of the blank, all of said means being manually operative in proper sequence through the medium of intermeshing gears and cams.

73. In a machine for manufacturing sanitary drinking cups, the combination of means for supporting a roll of paper, intermittently operative gear driven means for feeding such paper, intermittently operative cam operated means for severing the paper, means for deflecting the paper thereby to form a pair of flat sides one longer than the other, an intermittently operative plunger for transversely folding and further feeding the severed blank, a shaft, gear driven mechanism on said shaft for reciprocating said plunger, the cam operating means for the severing means being also carried by said shaft, a stationary former coöperating with the plunger for folding the side edges of the paper, gear driven means for crimping the so folded side edges, cam operated means for folding a flap over the folded side edges of the paper, said cam operating means being also carried by the aforesaid shaft, and manually operative means for rotating said shaft.

74. In a machine for manufacturing sanitary drinking cups, the combination of means for supporting the paper, means for feeding it in one direction, means for deflecting it in another direction, and means comprising a shiftable plunger in position to engage the inside of the paper after it is deflected and to fold the paper transversely to form a pair of flat sides and then effective to further feed the paper into position to have its side edges folded a plurality of times, and means comprising a former effective to fold and infold the side edges of the cup.

75. In a machine for manufacturing sanitary drinking cups, the combination of means for supporting the paper, means for feeding it in one direction, means for deflecting it in another direction, means comprising a shiftable plunger in position to engage the inside of the paper after it is deflected to fold the paper transversely to form a pair of flat sides one longer than the other thereby to form a flap and then effective to further feed the paper into position to have its side edges folded a plurality of times, means comprising a former effective to fold and infold the side edges of the cup, and means for then folding the flap over said side edges.

76. In a machine for manufacturing sanitary drinking cups, the combination of means for supporting the paper, means for feeding it in one direction, means for deflecting it in another direction, means comprising a shiftable plunger in position to engage the inside of the paper after it is deflected to fold the paper transversely to form a pair of flat sides one longer than the other thereby to form a flap and then effective to further feed the paper into position to have its side edges folded a plurality of times, means comprising a former effective to fold and infold the side edges of the cup and the flap, and means for then folding the flap with its folded side edges over the folded side edges of the cup body.

77. In a machine for manufacturing sanitary drinking cups, the combination of means for feeding a cup blank in one direction, means for deflecting a part thereof to form a pair of flat sides one longer than the other to form a flap, means for severing the blank, means for then engaging the blank to fold it transversely, means for folding the side edges of the cup body and the flap a plurality of times, and means for folding the flap with its folded side edges over the folded side edges of the body.

78. In a machine for manufacturing sanitary drinking cups, the combination of means for feeding a cup blank in one direction, means for deflecting a part thereof to form a pair of flat sides one longer than the other to form a flap, means for severing the blank, means for then engaging the blank to fold it transversely, means for folding the side edges of the cup body and the flap a plurality of times, means for folding the flap with its folded side edges over the folded side edges of the body, and means for crimping the folded side edges of the cup body and flap.

79. In a machine for manufacturing sanitary drinking cups, the combination of a paper roll supporting means, means for feeding a web of paper, means for severing a cup blank from the web, means for transversely folding the blank with one side longer than the other to form a flap and further feeding the blank, a fixed non-movable means for folding the side edges of the cup blank a plurality of times, and means for folding said flap over the body of the cup.

80. In a machine for manufacturing sanitary drinking cups, the combination of paper roll supporting means, means for feeding a web of paper, means for severing a cup blank from the web, means for transversely folding the blank to provide a pair of flat sides one longer than the other thereby to form a flap and further feeding the blank, a fixed non-movable means for folding the side edges of the cup blank and the flap a plurality of times, and means for then folding the flap with its folded side edges over the folded edges of the cup body.

81. In a machine for manufacturing sanitary drinking cups, the combination of paper roll supporting means, means for feeding a web of paper, means for severing a cup blank from the web, means for transversely folding the blank to provide a pair of flat sides one longer than the other thereby to form a flap, and further feeding the blank, a fixed non-movable means for folding the side edges of the cup blank and the flap a plurality of times, means for crimping the folded side edges of the body and the flap, and means for then folding the flap with its folded side edges over the folded edges of the cup body.

82. In a machine for manufacturing sanitary drinking cups, the combination of paper roll supporting means, means for feeding a web of paper, means for severing a cup blank from the web, means for transversely folding the blank to provide a pair of flat sides one longer than the other thereby to form a flap and further feeding the blank, a fixed non-movable means for folding the side edges of the cup blank and the flap a plurality of times, means for crimping the folded side edges of the body and the flap, means for then folding the flap with its folded side edges over the folded edges of the cup body, and means for further crimping the side edges of the body and the flap as the flap is folded upon the body.

Signed at New York city, New York, this 3rd day of April, 1919.

ALEXANDER NELSON.
BENJAMIN B. AVERY.